US009787374B1

(12) United States Patent
Woodward et al.

(10) Patent No.: US 9,787,374 B1
(45) Date of Patent: Oct. 10, 2017

(54) SYSTEMS AND METHODS FOR HIGH-RATE RF COMMUNICATIONS EMPLOYING SPATIAL MULTIPLEXING IN LINE OF SIGHT ENVIRONMENTS

(71) Applicant: TT GOVERNMENT SOLUTIONS, INC., Basking Ridge, NJ (US)

(72) Inventors: Ted K. Woodward, Basking Ridge, NJ (US); Tom Banwell, Basking Ridge, NJ (US); Eric Beck, Basking Ridge, NJ (US); Eddie Fung, Basking Ridge, NJ (US); John C. Koshy, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 14/333,156

(22) Filed: Jul. 16, 2014

Related U.S. Application Data

(60) Provisional application No. 61/846,900, filed on Jul. 16, 2013.

(51) Int. Cl.
*H04B 7/04* (2017.01)
*H04B 7/06* (2006.01)
(Continued)

(52) U.S. Cl.
CPC ........ *H04B 7/0413* (2013.01); *H04B 7/0697* (2013.01); *H04B 7/08* (2013.01); *H04L 1/20* (2013.01); *H04W 52/0203* (2013.01)

(58) Field of Classification Search
CPC .......... H04B 7/0413; H04B 7/04; H04B 7/08; H04B 7/0891; H04B 7/06; H04B 7/0417;
(Continued)

(56) References Cited

U.S. PATENT DOCUMENTS 7,095,812 B2   8/2006  Chan et al.
7,593,489 B2   9/2009  Koshy et al.
(Continued)

OTHER PUBLICATIONS

Pierre-Jean Bouvet et al., "Low Complexity Iterative Receiver for Linear Precoded MIMO Systems," ISSSTA2004, Sydney, Australia, Aug. 30-Sep. 2, 2004.
(Continued)

*Primary Examiner* — Betsy Deppe
(74) *Attorney, Agent, or Firm* — Heslin Rothenberg Farley & Mesiti P.C.

(57) ABSTRACT

A system and method to optimize a multiple-input multiple-output signal processing RF communication system that includes obtaining, by a processor, at the receiver, during spatial processing, metrics from the channel stream. The metrics include a spatial correlation metric representing spatial coupling between multiplexed streams in the channel stream, a signal-to-noise power ratio metric representing propagation losses encountered by the signal, and a cross polarization discrimination metric representing whether polarization modes can be processed as independent groups. The processor obtains these metrics based on obtaining geometric information related to the receiver and the transmitter. Predictive methods may be employed to determine expectations for some metrics in advance. The method includes applying a policy with at least one objective of the system, and based on at least one metric and the policy, applying at least one adaptation to at least one of: the receiver or, the transmitter.

18 Claims, 9 Drawing Sheets

(51) Int. Cl.
*H04B 7/08* (2006.01)
*H04W 52/02* (2009.01)
*H04B 7/0413* (2017.01)
*H04L 1/20* (2006.01)

(58) Field of Classification Search
CPC ........... H04B 7/0697; H04L 1/06; H04L 1/20; H04W 52/02; H04W 52/0203; H04W 52/0206
USPC .......................................... 375/267, 340, 347
See application file for complete search history.

(56) References Cited

U.S. PATENT DOCUMENTS

| | | | |
|---|---|---|---|
| 8,737,539 B2 | 5/2014 | Koshy | |
| 8,767,657 B1* | 7/2014 | Dehghan | H04L 27/2647 370/329 |
| 8,908,787 B2* | 12/2014 | Piazza | H01Q 1/1257 375/267 |
| 2003/0235149 A1 | 12/2003 | Chan et al. | |
| 2006/0253765 A1 | 11/2006 | Boer et al. | |
| 2007/0041475 A1 | 2/2007 | Koshy et al. | |
| 2007/0207837 A1* | 9/2007 | Nakaya | H04B 7/0874 455/562.1 |
| 2009/0262843 A1* | 10/2009 | Krasny | H04B 7/0619 375/260 |

OTHER PUBLICATIONS

Koshy et al., A New Low-Complexity Demapper for High-Performance Iteractive MIMO: An Information-Theoretic and BER Analyses, Proc. IEEE ICASSP '05, Mar. 2005, vol. 3, pp. 1029-1032.
Baro et al., Iterative Detection of MIMO Transmission Using a List-Sequential (LISS) Detector, Proc. IEEE Int. Conf. on Commun. ICC03, May 2003, pp. 2653-2657.
Hochwald et al., "Achieving Near-Capacity on a Multiple-Antenna Channel", IEEE Trans, Commun., vol. 51, No. 3, pp. 389-399.
Robertson et al., "A Comparison of Optimal and Sub-Optimal MAP Decoding Algorithms Operating in the Log Domain" Proc. IEEE Int. Conf. Communications, Jun. 1995, pp. 1009-1013.
Koshy et al., "Iteractive MIMO Detector Using a Group-Wise Approach", IEEE Sarnoff Symposium, Apr. 30-May 2, 2007, pp. 1-7.
Eric Tokildson et al.: Millimeter-Wave MIMO: Wireless Links at Optical Speeds, 9-pages.
Emmanouel Michaildis et al.: Geometry-Based Modeling of Cross-Polarization Discrimination in HAP Propagation Channels, 2013 7th European Conference on Antennas and Propagation, pp. 2296-2300.

* cited by examiner

SYSTEMS AND METHODS FOR HIGH-RATE RF COMMUNICATIONS EMPLOYING SPATIAL MULTIPLEXING IN LINE OF SIGHT ENVIRONMENTS

CROSS REFERENCE TO RELATED APPLICATION

The present invention claims priority from U.S. provisional patent application No. 61/846,900, filed Jul. 16, 2013, which is hereby incorporated herein by reference in its entirety.

STATEMENT REGARDING FEDERALLY SPONSORED RESEARCH OR DEVELOPMENT

The disclosed invention was made with government support under contract No. HR011-13-C-0079 awarded by the United States Department of Defense. The government has certain rights in the present invention.

FIELD OF INVENTION

The present invention relates to radio frequency (RF) communications and, more specifically, increasing the link capacity of mobile and/or fixed RF communication systems at affordable bandwidth and computational complexity in systems incorporating multiple-input multiple-output (MIMO) digital signal processing.

BACKGROUND OF INVENTION

RF spatial multiplexing using MIMO-based methods has typically focused on environmental sources of multi-path as a means to achieve spatial multiplexing gain. Thus, MIMO spatial multiplexing schemes either rely on environmentally derived multipath at lower carrier frequencies, or do not use scalable and adaptable MIMO algorithms with predictive complexity when operating in line of sight (LOS) channels. Additionally, these methods are not adapted based on spatial correlation. Meanwhile, analog schemes to achieve spatial multiplexing suffer from an inability to adapt easily to channel and system variability, creating feasibility issues for practical deployment MIMO computational schemes are also unable to adapt the required computational power, and thereby incur operating power penalties when operating in low-correlation environments, making them less desirable in power-constrained environments.

Hence, present methods do not couple correlation prediction, computational complexity, and MIMO algorithm sophistication. A system and method with these characteristics provides flexibility in spatial multiplexing systems.

Although spatial multiplexing is important for meeting goals of high rate (e.g., 100 Gb/s) RF links for range and capacity, its practical use on long-endurance aerial or fixed, power constrained platforms presents challenges. Motion of spatially separated multi-aperture transmit and receive platforms induces a sampling of the full correlation range of signals which, at high rates, results in prohibitive processing complexity and power consumption for the known MIMO signal processing algorithms. For example, applying a conventional MIMO algorithm such as the list sphere detector (LSD) to a 4×4 polarization multiplexed system (8 transmit streams) in which independent processing over polarizations is possible, would incur a computational cost in excess of 25,000 operations per bit for the MIMO demapper. At the rough computational density per watt (CDW) of a graphics processing unit (GPU) of ~3 GOPS/W (giga-operations per second per watt), this algorithm would consume over 800 kW of power for 100 Gb/s of throughput. Thus, methods that enable orders-of-magnitude improvements are necessary to meet ambitious high rate transmission goals.

SUMMARY OF INVENTION

Shortcomings of the prior art are overcome and additional advantages are provided through the provision of method of adapting a method and computing system by predicting the spatial correlation environment obtained by geometric considerations. By adding spatial correlation to link scaling, this metric, in addition to bandwidth and signal-to-noise ratio (SNR), enables system to operate at a much higher capacity than alternative RF link systems at equivalent bandwidth and SNRs.

Shortcomings of the prior art are also overcome and additional advantages are provided through the provision of a method of optimizing a Multiple-Input Multiple-Output signal processing transmitter and a Multiple-Input Multiple-Output (MIMO) signal processing receiver in a high rate radio frequency (RF) link system, the method includes: obtaining, by a processor, at the receiver, during spatial processing, relevant metrics. One can identify at least three such metrics available from a channel stream, wherein the channel stream comprises a plurality of streams, the at least three metrics including: a spatial correlation metric representing spatial coupling between multiplexed streams in the channel stream; a signal-to-noise power ratio metric representing propagation losses encountered by the signal; and a cross polarization discrimination metric representing whether polarization modes can be treated as independent groups in spatial processing, wherein the processor obtains at least one of the at least three metrics based on obtaining geometric information related to the receiver and the transmitter; and applying a policy comprising at least one objective of the RF link system; and based on at least one of the at least three metrics and the policy, applying at least one adaptation to at least one of: the receiver or, the transmitter.

Additional features are realized through the techniques of the present invention, including but not limited to provision of a method of adapting MIMO detection at a receiver in a high rate radio frequency (RF) link system, the method including: obtaining, by a processor, spatial correlation estimates related to a channel stream based on pointing acquisition and tracking data, and system geometry; based on the spatial correlation estimates determining, by the processor, a level of spatial correlation; based on the determining, applying a MIMO detection method comprising demapping each stream of the channel stream independently or utilizing group-wise demapping to demap the streams of the channel stream.

Computer systems, computer program products, and methods relating to one or more aspects of the technique are also described and may be claimed herein. Further, services relating to one or more aspects of the technique are also described and may be claimed herein.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
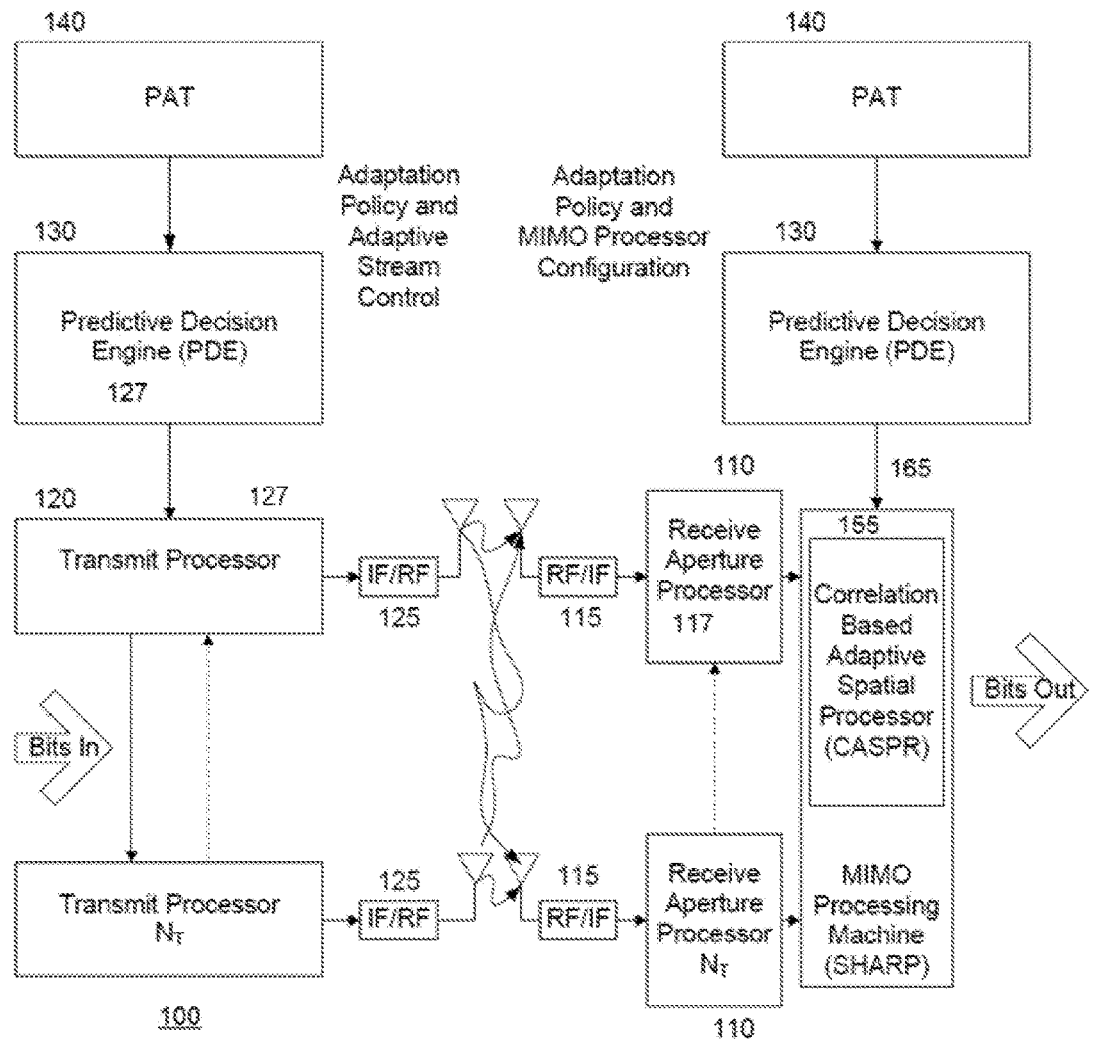
FIG. 1 depicts a computer system configured to perform an aspect of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The system, method, and computer program product described herein address the problem of increasing the link capacity of mobile or fixed RF communication systems at affordable bandwidth and computational complexity. The present techniques concurrently reduce the computing operations per bit and increase the CDW for high-rate, mobile and/or fixed MIMO platforms. Aspects of the present technique include a dynamic, predictive adaptation of (1) algorithmic complexity, (2) the configuration of an underlying computing system, and (3) transmit stream characteristics, to minimize power consumption for a given set of link conditions (e.g., correlation and signal-to-noise ratio, SNR) and mission goals. Certain portions of the system described can be used in conjunction with each other, as well as independently, coupled to commercially available systems, to provide the user with these advantages. Embodiments of the present invention utilize spatial correlations between elements in a Multiple-Input Multiple-Output (MIMO) high rate radio frequency (RF) link system in order to provide an adaptive processing solution that enables increased efficiency.

Embodiments of the present invention utilize spatial correlation to optimize link capacity of mobile or fixed RF communication systems. In an embodiment of the present invention, by using spatially separated antennas at millimeter wave frequencies where line-of-sight (LOS) propagation is the dominant transmission mode, novel scalable multiple-input multiple-output (MIMO) digital signal processing algorithms efficiently separate individual transmit channels from one another at computational efficiency (operations/bit) much lower than prior art approaches. In further embodiments of the present invention, a system includes an adaptable computing platform configured to vary the computational power available to match the requirements of the adaptable algorithm, such that the power consumption (i.e., Watts/operations) is minimized.

In an embodiment of the present invention, adaptation of a MIMO detection algorithm and of a computing system to process the data detected is achieved through predictions of the spatial correlation environment obtained by geometric considerations. Through these techniques, a third dimension (i.e., spatial correlation) is added to link scaling (in addition to bandwidth and signal-to-noise ratio), enabling much higher capacity than alternative RF link systems at equivalent bandwidth and SNR.

Elements of an embodiment of the present invention configured to perform techniques of the present invention will be discussed in reference to FIG. 1. Three portions of the system 100 are 1) a predictive decision engine (PDE) 130; a 2) a Correlation-based Adaptive Spatial Processor (CASPR) 155; and 3) a Scalable High-performance Adaptable Reconfigurable Processor (SHARP) 165. One or more of these elements can be used at one time within a MIMO system to achieve optimize power and/or bandwidth for the system 100.

FIG. 1 is an embodiment of aspects of the present system 100. For ease of understanding, certain processing elements of the system 100 are shown in multiples. The duplication of processors is done to illustrate the functionality of the system 100, however, a single and/or multiple processors can be utilized in various embodiments of the present invention in order to accomplish the methods described herein. The system 100 includes at least one MIMO digital signal processing receiver 110 and at least one MIMO signal processing transmitter 120.

Specifically, as seen in FIG. 1, more than one PDE 130 can be utilized in embodiments of the present system. In the embodiment of FIG. 1, one PDE 130 is coupled to at least one transmitter 120, while another is coupled to at least one receiver 110 of the system 100. As will be discussed in further detail, one or more PDE 130 can be utilized in a given embodiment of the present invention to optimize a Multiple-Input Multiple-Output signal processing transmitter and/or a Multiple-Input Multiple-Output signal processing receiver.

The PDE 130, CASPR 155, and SHARP 165 may comprise one or more processors that execute computer-readable code, also called software. In an embodiment of the present invention, SHARP 165 is an interconnected multi-element digital processing subsystem. PDE 130, CASPR 155, and SHARP 165, although designated as three separate elements for ease of understanding, can all be included in one physical computing resource, such as a computer resource with a single processor. The computer program code that is executed to enable functionality to be described in reference to these elements is located on a one or more computer readable medium/media that is/are accessible to the one or more processors within these elements.

As an overview, in an embodiment of the present invention, the PDE 130 utilizes geometric data describing the system 100, and/or predictive reasoning to determine adaptations to the environment that will achieve pre-determined policy objectives. Specifically, the PDE 130 adapts at least one transmitter 120 and/or at least one receiver 110 of a MIMO system 100 to optimize the performance of the system to a certain policy, the policy can be, for example, a policy of maximizing bandwidth, and/or a policy of maximizing power. In an embodiment of the present invention, the PDE 130 may make these adaptations without receiving feedback directly. For example, a processor in the system 100 may obtain metrics without utilizing a feedback channel from the receiver.

CASPR 155 detects the MIMO streams and selects and applies a specific MIMO detection method to the received transmissions based on spatial correlation between elements of the system 100, and/or a signal-to-noise ratio of each stream.

SHARP 165, a multi-threaded processing environment, processes the MIMO data by adjusting the computing resources, including powering on and off certain system elements, to process the data at a high computational efficiency.

In FIG. 1, SHARP 165 and CASPR 155 are pictured as executing on the same physical computer system 100 resource. This configuration is one example of the resource configuration that can be utilized to practice aspects of the present technique. One of skill in the art will recognize that the functionality of these elements can be practices by one or more resources, both shared and/or separate. The system 100 of FIG. 1 was chosen as a non-limiting example in order to illustrate certain aspects of the present invention.

At its core, spatial multiplexing works to resolve multiple transmitters so that the individual information streams can be received separately. This requires a lens, or its equivalent, large enough to spatially resolve the individual transmitters. Within a lens, focusing is manifested by the summation of many rays, each with its own time-of-flight delay through the lens material. Coherence and well controlled delay are essential to the resolving function of the lens. For the carrier wavelengths and point-to-point link distances under consideration, such a lens would be very large, in fact mechanically impractical for an airborne platform.

The spatial multiplexing scheme in the system 100 embarks on the task of constructing a large "sparse lens", e.g. a lens that is obscured to only allow "light" from small areas across the face of the aperture to reach the focal plane. Each receiver antenna is a small aperture on the face of the single large aperture. The outputs of each antenna can be delayed and summed in a weighted way to synthesize the time-of-flight delays that occur naturally in a lens. This is sufficient for our spatial multiplexing scheme because the "grating lobes" that occur with a sparse array can be placed in spatial positions where there is no energy. It works because there are only a very few points of "light" to focus on, that is the small number of transmit apertures.

Returning to FIG. 1, the receiver 110 and the transmitter 120 both include spatially separated antennas, the receiver antennas 115 and the transmitter antennas 125 are spaced at millimeter wave frequencies where LOS propagation is the dominant transmission mode. Each receiver 110 also includes a receive aperture processor 117. Each transmitter also includes a transmit processor 127. Although the transmit processor 127 and receiver aperture processor 117 are depicted as separate system elements in FIG. 1, the functionalities represented by these system elements can be accomplished utilizing one or more processing resources, provided that the resources are coupled to the receiver antennas 115 and/or the transmitter antennas 125.

In general, multiple input, multiple output (MIMO) links utilize synchronized flows across widely spaced multiple apertures. This allows spatial processor to optimally capture all the energy of any given symbol available at each receiver aperture, allowing for maximal signal processing gain. This synchronization requirement is apparent given the magnitude of the time-of-flight delays that would occur across the single large aperture discussed at the beginning of this note. Consider as an example the situation presented in FIG. 2A.

As seen in FIG. 1, aspects of the present technique include a predictive method that uses pointing acquisition and tracking (PAT) data 140, since it provides both range and heading data, which are the variables for predicting MIMO channel correlation for this system. As will be explained, predictive methods may be employed to determine expectations for one or more metrics in advance. This approach avoids the need for receive channel state feedback.

Figure 2A:
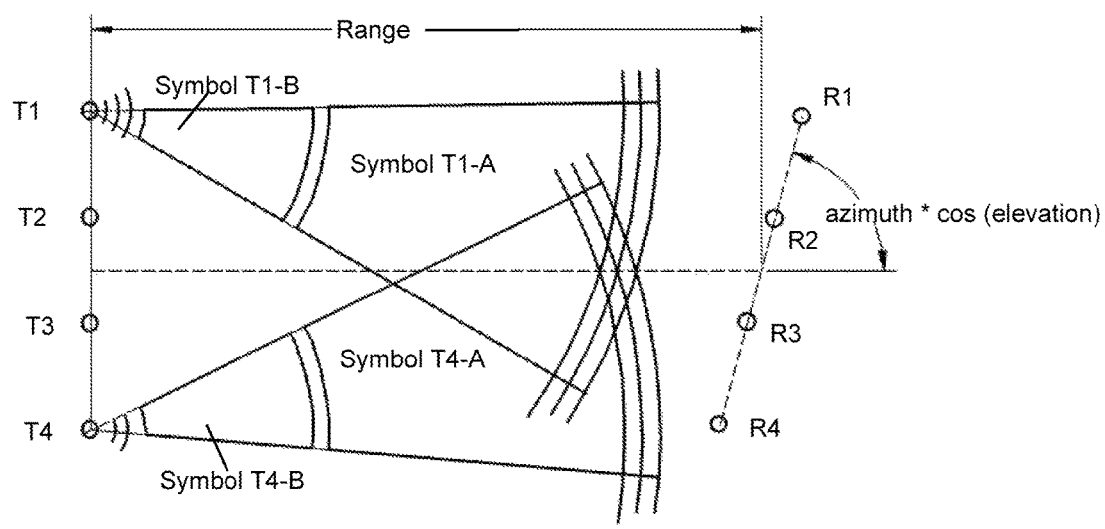
FIG. 2A-2C depicts one or more aspects of the present invention.

As seen in FIG. 2A, delay distortion introduced by an oblique receiver array can be corrected by using the receive side PAT information to advance or retard the samples at each receive antenna. If a spatially multiplexed wavefront, from transmitter T1 were to arrive obliquely at the receiver array, each receiver antenna would capture the energy from any given symbol at different times. This time-of-flight delay is predictable from the receiver array geometry and the transmitter bearing using receiver-side antenna PAT information. Knowing this, the receive aperture signal processing can advance or retard the samples associated with each receive antenna by a computed amount relative to a master timing signal. In this way, the samples from each single input single output (SISO) radio can be collected and transferred to the spatial processor as an aligned symbol group. This reduces the signal space that the spatial processor must search to demodulate spatially multiplexed streams.

Baud rate can affect the synchronization process in embodiments of the present invention. Waveforms requiring a high symbol rate may also uniquely identify synchronizing and sounding symbols within any stream for the time-of-flight across the receiver array in an embodiment of the present invention.

Figure 2B:
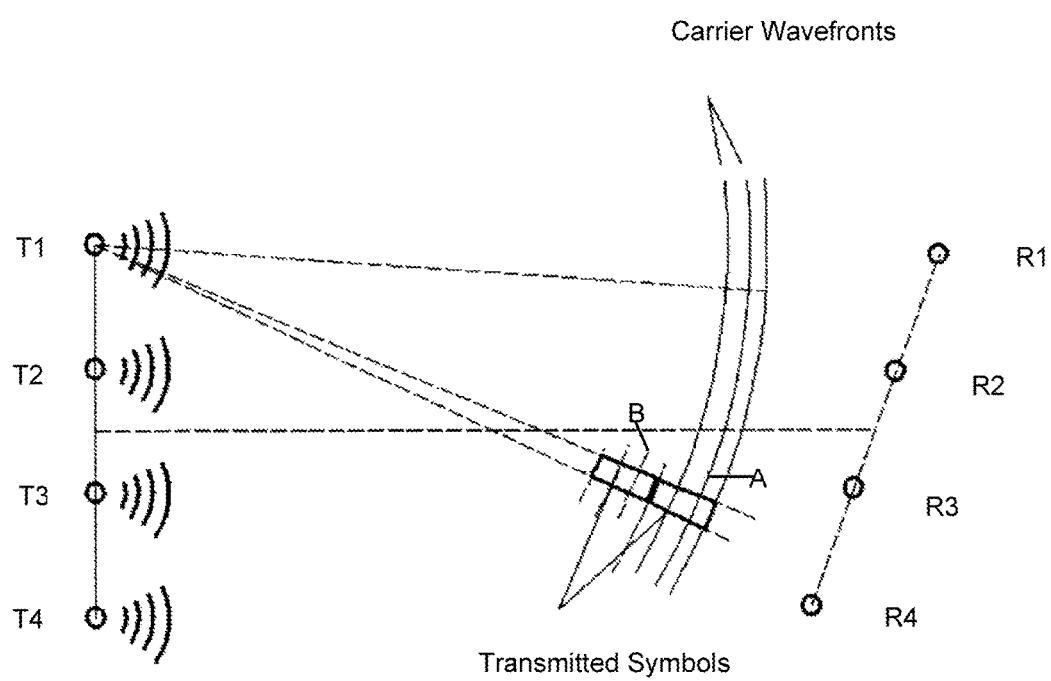

As illustrated in FIG. 2B, the spatial extent of each symbol is large when compared to the size of the receiver array. In this case it is relatively easy for the receiver processor to avoid an ambiguity as to which symbol is being processed in the receiver processors at a given instant. Such is the situation one might encounter with a multicarrier waveform basis such as orthogonal frequency division multiplexing (OFDM). On the other hand, a wide-band carrier-modulated signal with a 1 Gbaud symbol rate could easily have 50 or more symbols in flight across the oblique face of a 30 meter receiver array. This is the situation illustrated in FIG. 2B. If one were to employ a high-symbol rate (e.g., single carrier) waveform, a means of unambiguously identifying symbols, particularly those used for synchronization and system response sounding, must be found. Fortunately this is easily accomplished by the appropriate use of unique sequences embedded in the training symbols and ensuring that the repetition rate of the sequences is much slower than any antenna array time-of-flight considerations.

Figure 2C:
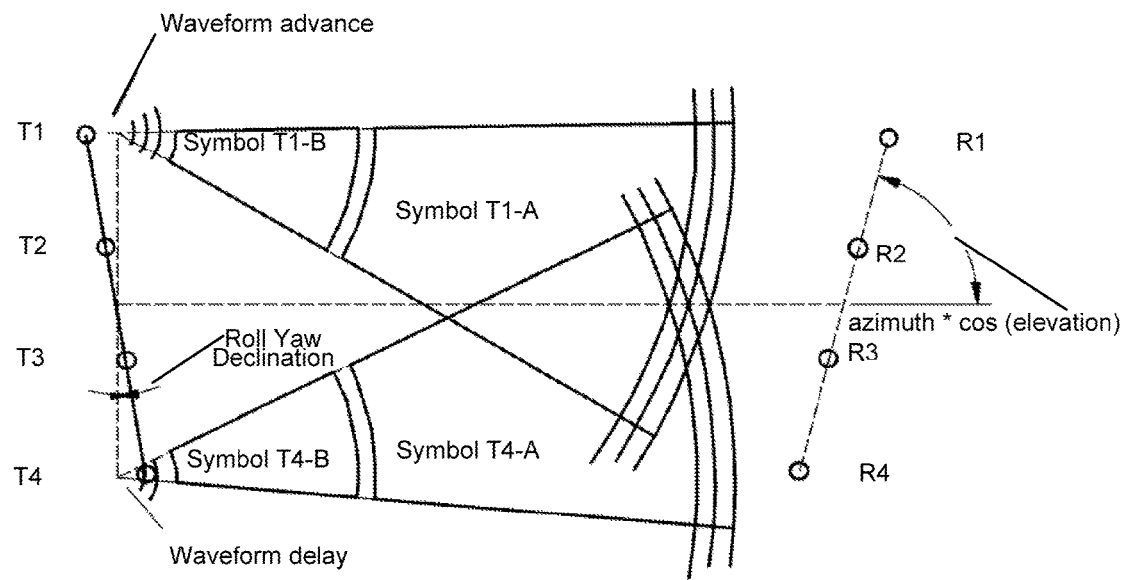

Delay distortion can also be introduced by the orientation of the transmitter array when it is not perpendicularly aligned to the bearing of the receiver. A compound situation, with delay distortion at both the receiver and transmitter, is shown in FIG. 2C. As shown, the transmitted streams are advanced or retarded based on the local transmitter PAT information, while the receiver timing is adjusted relative to the local receiver PAT information.

Referring to FIG. 2C, delay distortion introduced by an oblique transmit array can be corrected by using the PAT information at the transmitter to advance or retard the transmit streams. In embodiments of the present invention, the motivation for time adjustment of the transmit streams may be slightly different than the receiver adjustment.

While receiver-side timing adjustment facilitates coherent combining for maximum processing gain, transmit side-timing adjustments allow the spatially multiplexed streams to align their respective orthogonal channel sounding periods. This minimizes the mutual interference during the sounding period, which improves channel-sounding results. It also minimizes the sounding period, which increases system throughput. Another benefit to the transmitter timing adjustment is that the symbol streams from each transmitter element can be time-aligned at the output of each receiver aperture processor. This means that the packets of samples from each receive aperture processor to a given spatial processor contain all the samples necessary to demodulate a set of time aligned symbols from all transmitters. In embodiments of the present invention, the use of digital systems may affect synchronization factors.

Figure 3:
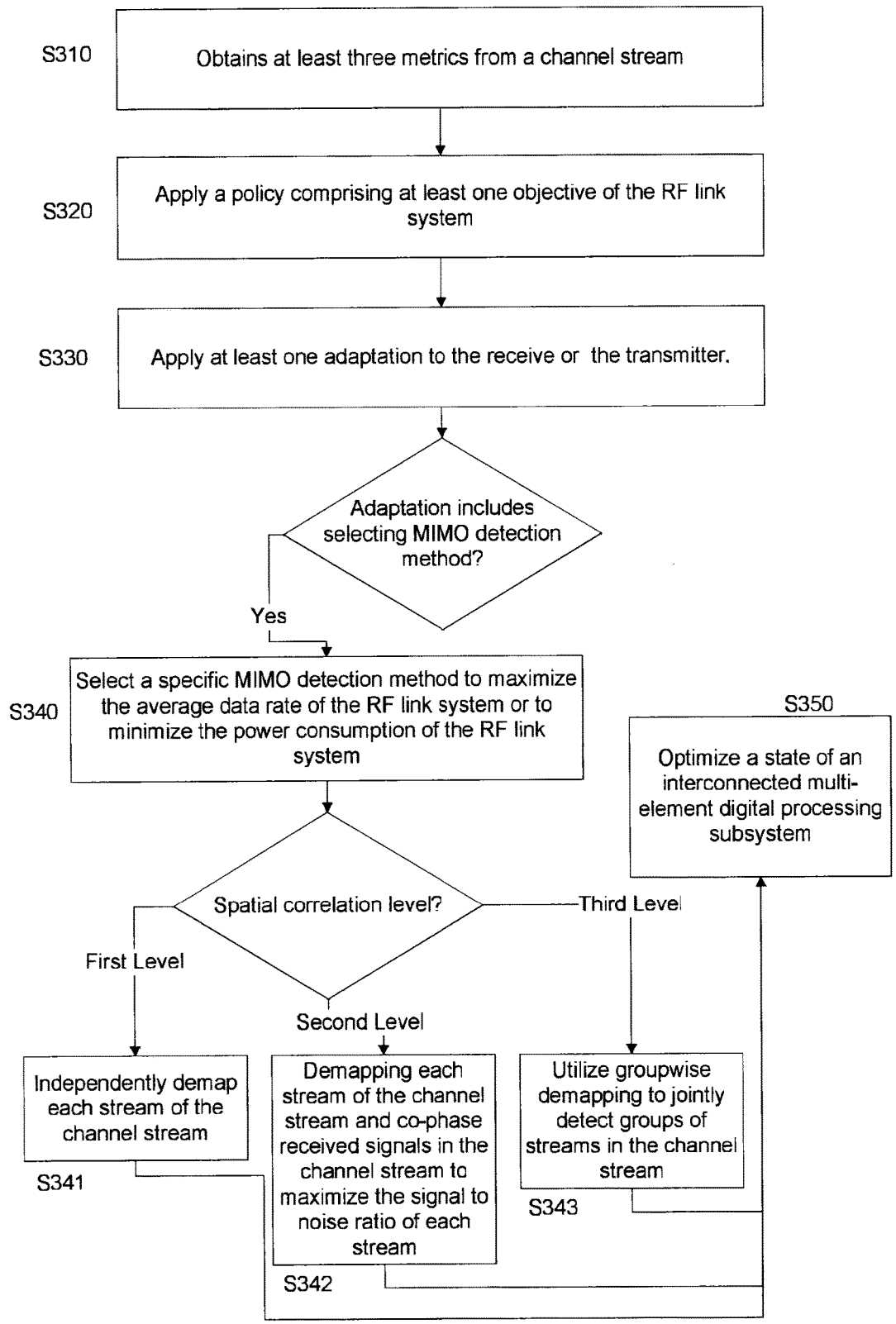
FIG. 3 depicts a workflow of an embodiment of the present invention

Returning to FIG. 1, the functionality of the receiver 110 and the transmitter 120 is affected by the PDE 130. The PDE 130, which is shown coupled to both the receiver 110 and the transmitter 120, can optimize the receiver 110 and the transmitter 120 in the system 100 by applying adaptations to the receiver 110 and/or the transmitter 120. FIG. 3 is a workflow of aspects of the functionality of the PDE 130.

As seen in FIG. 3, the PDE jointly optimizes link performance (in supportable rate, range and energy efficiency), to implement a policy that can adapt MIMO transmitter and receiver behavior to respond to dynamic channel conditions and mission objectives. The policy applied by the PDE 130 is driven by at least three metrics tied to features of the link. The adaptation policy driving the PDE 130 uses these metrics to effect a specific combination of transmit and receive operating modes. A set of appropriate policies can be established a priori and/or dynamically to optimize a transmitter 120 and/or a receiver 110.

As described in greater detail below, in order to optimize the links of the system 100, a processor accessible to or internal to the PDE 130, obtains data to firm up the connection between the predicted system 100 behavior, which drives policy, and actual channel conditions. The data may include geometric and actual correlation, operation in different correlation regimes and transmitter conditions, and other motion effects including Doppler. In order to optimize the behavior of the receiver and/or transmitter of the system 100, the PDE 130 can apply a wide range of adaptations. Sources for data include, but are not limited to, spatial awareness of the location of system elements, including the receivers, relative to other system elements, known trajectory (if the system is mobile), and/or third party data (including navigational information and GPS coordinates).

In an embodiment of the present invention, the PDE 130 can obtain both existing geometric data, and/or can predict geometric relationships. In a fixed system, the geometric relationships are static. However, in a mobile system, the geometry of the system, including but not limited to the distance between the receiver 110 and the transmitter 120, is subject to change, so the PDE 130 can use the spacing at a given time, in addition to other factors, to predict the geometry at a different time. Thus, the PDE 130 may obtain the geometry of antennas of the transmitter, the geometry of antennas of the receiver, and a relative relationship between the geometry of antennas of the transmitter and the geometry of antennas of the receiver as well as apply a predictive method based on geometry of antennas of the transmitter and geometry of antennas of the receiver, and a relative relationship between the geometry of antennas of the transmitter and the geometry of antennas of the receiver, in order to predict the geometry at a different time.

Transmit adaptations made by the PDE 130 include, but are not limited to, power level adjustments (including, but not limited to, turning transmitters OFF/ON), per-stream modulation and per-stream FEC encoding. Receive adaptation options include, but are not limited to, adapting the degree of sophistication of the MIMO detection algorithms, and selecting the option of processing both polarizations jointly or independently. As understood by one of skill in the art, joint processing is more complex, but better suited to handle cross-talk in cases where severe depolarizing occurs.

As seen in FIG. 3, a processor utilized by the PDE, which includes, but is not limited to, one or more of the receive aperture processor 117 and/or the transmit processor 127, obtains, at the receiver, during spatial processing, at least three metrics from a channel stream (S310). In an embodiment of the present invention, the processor obtains at least one of the at least three metrics based on obtaining geometric information related to the receiver 110 and the transmitter 120.

In an embodiment of the present invention, the channel stream includes multiple streams. Embodiments of the present invention can obtain the metrics from PAT data, since this type of data provides both range and heading data, which are the variables for predicting MIMO channel correlation for this system. FIG. 1 depicts the PAT data 140 being obtained by the PDE 130. Methods of the present invention may avoid the need for receive channel state feedback.

In an embodiment of the present invention, in the absence of channel state feedback, a processor is made aware of the metrics obtained at the receiver by obtaining the geometry of antennas of the transmitter 125 and geometry of antennas of the receiver 115, and a relative relationship between them. The processor may also be made aware of some of the metrics, including but not limited to, the later discussed spatial correlation and signal-to-noise ratio (SNR) metrics, by applying a predictive method that is based on the geometry of antennas of the transmitter 125 and the geometry of antennas of the receiver 115, and a relative relationship between these elements.

In an embodiment of the present invention, the metrics obtained include a spatial correlation metric representing spatial coupling between multiplexed streams in the channel stream, a signal-to-noise (SNR) power ratio metric representing propagation losses encountered by the signal, and a cross polarization discrimination metric (XPD) representing whether polarization modes can be treated as independent groups in spatial processing.

Spatial correlation, ρ, is the maximum value of the collection of pair-wise spatial correlation values between the array responses of different streams. For the k th and l th streams, it is computed using the channel estimates as captured in equation 1 below.

$$\rho_{k,l} = |h_k^H h_l| / (\|h_k\| \|h_l\|) \qquad \text{Equation 1}$$

The spatial correlation metric provides a measure of the degree of spatial coupling between the spatially multiplexed streams.

The signal-to-noise power ratio, SNR, metric is defined as the average (over the receive antennas) of the value of the ratio of signal power to noise power measured per receive aperture. It determines the type of FEC to be used to achieve the coding gain necessary to close the link. This metric captures the propagation losses encountered by the signal. Waveforms will have silence periods that will allow the calculation of noise power. As will be understood by one of skill in the art, estimates of SNR are possible from geometric considerations, with well-known uncertainties.

Cross polarization discrimination (XPD) measures the degree of isolation between the two polarization modes and is also calculated using the correlation metric of Equation 2, where $\rho_k$ is the correlation between receiver responses of each polarization mode for the k th stream.

$$XPD = \min\{1-\rho_k\}_{k=1,\ldots N_T} \quad \text{Equation 2}$$

XPD enables the processor to determine whether polarization modes can be treated as independent groups for the purposes of spatial processing. If XPD is inadequate (or, when there is a high degree of crosstalk), streams in both modes are extracted jointly. Depending on the sophistication of the spatial processor employed, differences in the computational complexity of the two approaches may be significant.

Figure 7:
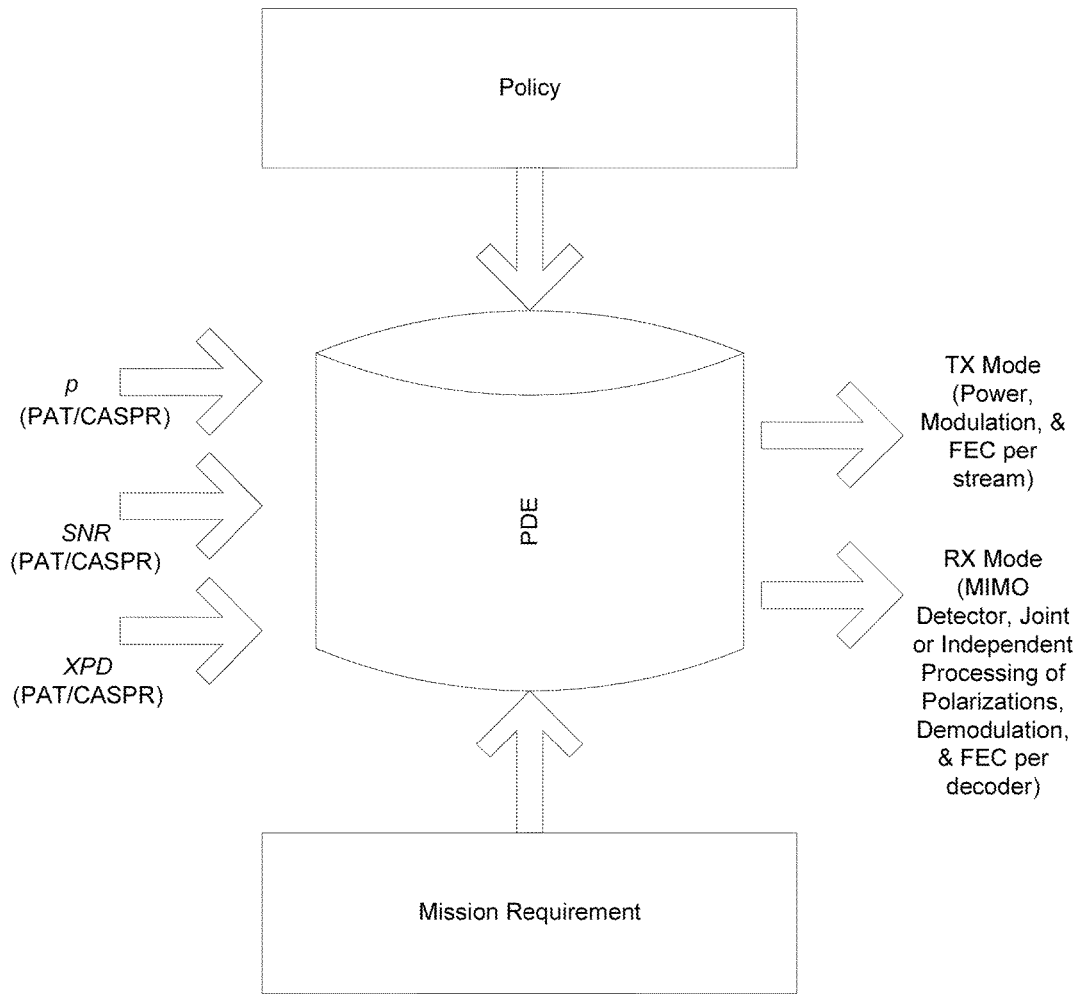
FIG. 7 depicts aspects of a component of an embodiment of the present invention.

All three of these metrics are available as part of the spatial processing at the receiver, and are therefore readily available for immediate receive adaptation. In case of transmit adaptation, control information can be obtained from PAT data 140, or from receive channel feedback. For example, both SNR and spatial correlation can be predicted via PAT data 140, and XPD can only be estimated through channel measurements at the receiver 110. In an embodiment of the present invention, PAT-derived metrics are noisier than estimates from receive processing. However, PAT has advantages of being robust, predictable, and distributed to all nodes in a network of multiple links. The functionality of the PDE 130, as described above, is also depicted in FIG. 7.

Returning to FIG. 3, the processor applies a policy comprising at least one objective of the RF link system (S320). The policy may aim to accomplish a given objective, including, but not limited to, maximizing a data rate of the RF link system, and/or maximizing energy efficiency of the RF link system.

As an aside, a spatially multiplexed MIMO system 100, such as that in FIG. 1, may utilize a channel sounding scheme. Channel sounding can identify dispersion artifacts within the SISO receivers and associated cabling so that their effects can be equalized. Assuming availability of PAT (local antenna bearing) information at transmitter and receiver allows for reduced processing overhead by enabling symbol timing alignment relative to boresight at both transmit and the receive arrays. The waveform utilized may utilize other system performance criteria including error correction, delay spread tolerance, or power amplifier optimization.

Embodiments of the present invention may apply a wideband modulation or a multi-carrier approach embodied by OFDM. OFDM is a convenient waveform for modern MIMO communication systems because it provides a means for subdividing the channel bandwidth into small, flat response chunks with minimal spectral efficiency penalties relative to single-carrier wide-band modulation. Compensation of channel and system response impairments is aided by pilot tones embedded within the waveform. The downside to this format is the well-documented requirement for transmit power backoff to accommodate its significant peak-to-average power ratio (PAPR). The countervailing risk to wideband single carrier modulation is the need to equalize dispersion across the wide signal bandwidth, with adaptive weights and associated training overhead to track time variation of channel characteristics. The use of PAPR control techniques well known to those skilled in the art of RF communications help to control inter-modulation distortion and reduces transmit power backoff, ensuring sufficient link margin for the system, Returning again to FIG. 3, based on at least one of the at least three metrics, and the policy, the processor applies at least one adaptation to at least one of: the receiver 120 or, the transmitter 110 (S330). This adaptation may include, but is not limited to, adapting power levels of the transmitter, adapting at least one of modulation type, error correction, encoding scheme, or coding rate for at least one stream of the channel stream, adapting a MIMO detection algorithm utilized by the receiver (which will be discussed in greater detail later), and/or changing processing options at the receiver related to polarization.

In an embodiment of the present invention, if the policy objective is maximizing a data rate of the RF link system 100, an adaptation applied by a processor using the PDE can include shutting down at least one transmitter. In a further embodiment of the present invention, when a policy objective includes maximizing energy efficiency of the RF link system 100, the PDE 130 may utilize the processor to disable at least one stream of the channel stream.

In an embodiment of the present invention, computer code executed by a processor associated with the PDE 130 in the system 100 may also initiate adaptive stream control, which an adaptation to the functionality of the transmitter. Adaptive stream control implements favorable tradeoffs among transmitter characteristics to minimize rate degradations and overall system power consumption. By selectively disabling streams and/or changing waveform characteristics, this stream control can handle conditions in which the combination of high correlation and range exceeds limits on MIMO demapping capabilities or powering constraints, and that would otherwise result in greatly reduced link capacity. Adaptive stream control can increase sustainable link capacity by a factor of 2.5, while reducing power consumption by an order of magnitude, compared with conventional non-adaptive MIMO.

Table 1 below shows an example of scenarios where PDE 130 (code executed by a processor embodies in this element) obtains data and as a results of the data obtained, makes adaptations to apply at least one policy.

TABLE 1

Example of adaptive stream control in a high correlation scenario (correlation >93%) for a mission objective of maximizing data rate.

| Number of Active Streams | Bits per Symbol M | Number of Recoverable Streams N | Total Raw Spectral Efficiency M * N bps/Hz |
|---|---|---|---|
| 4 | 2 | 2 | 2 × 2 = 4 |
| 3 | 2 | 3 | 2 × 3 = 6 |
| 2 | 5 | 2 | 2 × 5 = 10 |

In the four stream scenario modeled in Table 1, the correlation is extremely high (>93%). This regime is beyond the capability of the most sophisticated detectors and 2 of the 4 streams are recoverable, reducing throughput (i.e., total spectral efficiency) to only 4 b/s/Hz from its nominal 8 b/s/Hz case (see first case). With a capability to shut down transmitters and vary the modulation scheme on active streams, shutting down one transmitter allows spatial multiplexing of 3 transmitted streams and the use of a higher constellation (8-QAM/PSK) for each active stream. Shutting down 2 transmitters allows the use of 32-QAM on both remaining streams (shown in the last case in the last row) for a total capacity of 10 b/s/Hz, which is in fact more than the nominal 4 stream case, and 2.5 times that of the 'always-on' case. The PDE 130 will apply this configuration when the policy is to maximize the data rate.

Table 2 is another example of PDE 130 applying adaptations to cause the system 100 to operate in accordance with a policy.

TABLE 2

Example of adaptive stream control in a high correlation scenario (correlation >93%) for a mission objective of minimizing power consumption.

| Number of Active Streams | Bits per Symbol M | Number of Recoverable Streams N | Raw Spectral Efficiency M * N bps/Hz | MIMO Alg. |
|---|---|---|---|---|
| 4 | 2 | 2 | 2 * 2 = 4 | High Complexity |
| 2 | 2 | 2 | 2 * 2 = 4 | Low Complexity |

Table 2 shows another example for a different mission objective of maximizing energy efficiency Once again, the first case depicts a high correlation condition. Here, transmit adaptation disables two streams to enable use of the lowest complexity MIMO detector (last row) and a 17× complexity reduction at the same capacity.

These policies may be implemented locally at each end of the MIMO system, as shown in FIG. 1. The PDE can also configure CASPR 155 with policies that govern algorithm adaptation (e.g., to maximize average data rate or to minimize power consumption).

As explained earlier, while PDE 130 determines what the system 100 should be doing to meet policy objective(s), the CASPR 155 implements how the system 100 will meet the objective(s), by selecting and implementing a MIMO detection method.

CASPR 155, by executing program code from an accessible resource on at least one processor, selects a MIMO detection method. For ease of understanding, the methods applied by the processor in CASPR 155 are explained in the context of algorithms. These algorithms and the method of dynamically varying algorithms during system 100 operation differ from previously known algorithms in the art at least because they are useable even when links of the system 100 are 100 G links and an entire correlation space from zero to near-unity. In a mobile example, maintaining data rates while minimizing power consumption necessitates the use of MIMO detection algorithms of varying complexity for different time segments of the flight path.

CASPR 155 may exercise at least three methods, described as three algorithms, depending on a level of spatial correlation. The correlation levels can be understood low level, medium level, and/or high level. CASPR 155 utilizes spatial correlation estimates (based on system geometry and PAT data) at the receiver to decide which method to use. Based on determining that the level is a low level, a processor in CASPR 155 executes program code to independently demap each stream of the channel stream, ignoring the other streams as the cross-coupling between streams is zero. Based on determining that the level is a medium level, a processor in CASPR 155 independently demaps each stream of the channel stream by applying a spatial filter to null interference from the other streams to maximize the signal-to-noise plus interference ratio of each stream. Based on determining that the level is a high level, the processor utilizes group-wise demapping (GWD) to jointly detect streams in the channel stream. This GWD approach is described in U.S. Pat. No. 7,593,489 entitled "Iterative STBICM MIMO Receiver Using Group-Wise Demapping," which is incorporated herein in its entirety. The GWD approach is also described in "Iterative MIMO detector using a group-wise approach," by J. C. Koshy, J. C. Liberti, and T. R. Hoerning, in IEEE Sarnoff Symposium, 30 Apr.-2 May 2007, pp. 1-7, which is also incorporated herein in its entirety.

As understood by one of skill in the art, GWD and the other mapping approaches discussed are meant as examples of specific demapping approaches that can be utilized by embodiments of the present invention. Further embodiments of the present invention may utilize other demapping processes, including but not limited to, other variations on these specific demapping approaches. GWD is used as an example because it lends itself to taking into account the spatial correlation and adjusting the processing complexity of the demapper as needed. In general, the spatial correlation and polarization mixing, both of which may be captured in a correlation metric, can be utilized by CASPR 155 as a metric for adjusting/adapting the complexity/sophistication of the demapper.

CASPR 155 utilizes spatial correlation estimates (based on system geometry and PAT data) at the receiver to decide which algorithm to use. Table 3 below is an example of correlation thresholds for each method, for an embodiment of the present invention. CASPR 155 applies increasingly complex methods as the complexity of the correlation environment increases. The CASPR 155 methods have far lower complexity than the current art. Also, CASPR 155 may dynamically switching among the methods (thus adapting the complexity) to suit time-varying correlation levels. For example, at the highest complexity, the Group-wise Demapper (GWD) with Soft Interference Cancellation (GWD w/SIC) method is >80× simpler in terms of operations per bit than list sphere detector (LSD). While at low complexity, the Single Stream Demapper (SSD) with Maximum Ratio Combining (MRC) is >1300× simpler.

TABLE 3

| Max Range/ Rayleigh | Correlation P | MIMO Algorithm (QPSK) |
|---|---|---|
| 1.5 | 0 ≤ ρ < 0.43 | Low complexity (SSD w/MRC) |
| 1.7 | 0.43 ≤ ρ < 0.54 | Medium complexity (SSD) |
| 4.75 | 0.54 ≤ ρ < 0.93 | High complexity (GWD w/SIC) |
| >4.75 | 0.93 ≤ ρ | Adaptive stream control |

In an embodiment of the present invention, the method selected by CASPR 155, can address all spatial multiplexing environments spanning high correlation peaks arising from regularly spaced arrays in the sub-Rayleigh regime, smeared pseudo-noise correlations arising from irregularly spaced arrays in the sub-Rayleigh region, as well as the consistently high correlation regime arising at distances beyond the Rayleigh distance. This flexiblity translates directly to mission benefits of more flexible flight paths, smaller arrays, and greater standoff distances.

The method applied to both low and medium correlation environments can be understood as a single stream demapper approach (SSD). For low correlations, SSD utilizes a spatial filter that is a maximal ratio combiner (MRC) that co-phases the received signals to maximize the SNR of the desired stream without resorting to computationally intensive matrix operations for spatial nulling of interferers that can cost hundreds of operations per bit. This method can be referred to as SSD w/MRC. For example, at the Rayleigh Range, a scale parameter defining a distance at which geometrically derived correlation between apertures vanishes for particular antenna separations (Rayleigh range for uniformly spaced linear arrays at broadside to one another is defined as $R_{Rayl}=d_T d_R N_{RA}/\lambda$, where $d_T$ and $d_R$ are the separation between adjacent antenna elements of the transmit and receive array, respectively, $N_{RA}$ is the number of antenna elements in the receive array and $\lambda$ is the wavelength), CASPR 155 can leverage the fact that the array responses of the spatially multiplexed streams are orthogonal.

As discussed earlier, for low to medium correlation environments, the method of MIMO detection selected and applied by CASPR 155 employs a per-stream demapping approach. In an embodiment of the present invention, To recover the kth stream, a spatial filter, $w_k$, is applied to the received signal vector y: $\hat{s}_k = w_k^H y$. This spatial filter suppresses the interference from all of the other streams. The cleaned up signal $\hat{s}_k$ is then ready to be demapped on a per-stream basis eliminating the near-exponential complexity in the number of streams associated with joint detection methods such as LSD. Here, each stream is demapped independent of the other streams.

In an embodiment of the present invention, for higher correlations, spatial filtering alone is inadequate to remove inter-stream interference, especially given a design with equal numbers of receive antenna elements and transmitted streams. In this case, CASPR 155 applied a group-wise demapping (GWD), where streams are jointly detected, as in the joint stream demapping (JSD) approaches, with the difference that joint detection is only performed within a group. The term JSD is used to describe both full-search demappers as well as list sphere detection (LSD) based partial-search demappers, since both perform joint detection over all of the transmitted streams. The JSD approach is described in U.S. Pat. No. 8,737,539 to J. Koshy, entitled "Low complexity iterative MIMO receiver based on successive soft interference cancellation and MMSE spatial filtering," which is incorporated herein by reference in its entirety as well as in the aforementioned "Iterative MIMO detector using a group-wise approach" paper.

For example, groups are created by exploiting soft interference cancellation, where the contribution of interfering streams in other groups to the received signal vector is eliminated by reconstructing the interfering symbols and a simple subtraction operation: $\hat{y}_k = y - H_{\bar{k}} \bar{s}_{\bar{k}}$. Here, $\bar{s}_{\bar{k}}$ is the collection of the soft symbol values of the interfering streams and $H_{\bar{k}}$ is the collection of the corresponding channel responses. The streams that are most correlated are assigned to the same group. Our assessment shows that the cost of grouping can be eliminated by exploiting the deterministic nature of the MMW MIMO channel (see below).

Figure 4:
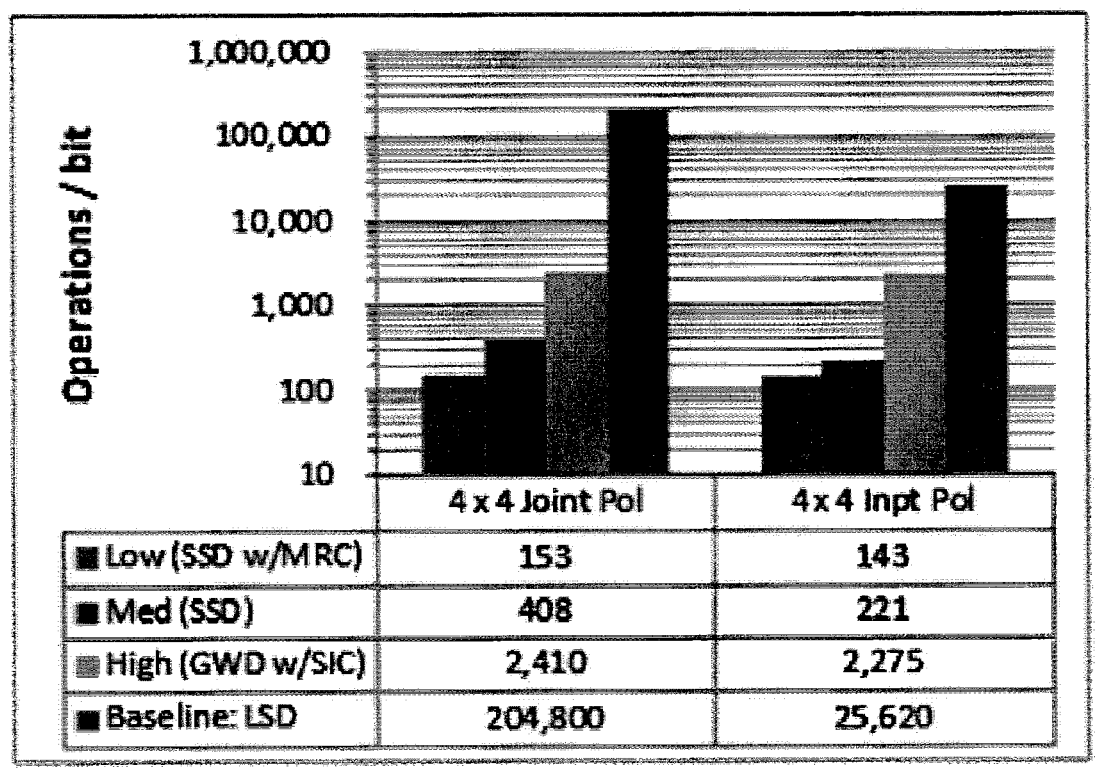
FIG. 4 depicts the computational complexity of method utilized by embodiments of the present invention.

FIG. 4 shows the predicted computational complexity for use of the three described methods in CASPR 155, compared with LSD. Results are shown both with and without support for polarization demapping, which would be necessary if polarization crosstalk has arisen in the channel that is not correctable by global adjustment of the orthogonal mode transducer (OMT) either by hand or through a digital polarization rotation.

Assuming channel correlation does drive MIMO detection algorithms, an embodiment of CASPR 155 that is a self-adapting spatial processor can be utilized in an embodiment of the present invention. The self-adapting functionality obviates the need for user selection of the algorithm by explicit command or system configuration. In this embodiment, a MIMO processor extracts channel estimates as an initial step and correlation is a direct output of this process. Since correlation drives the method (algorithm) execution, for methods in which a lower complexity case is a proper subset of the next most complex method, and so forth, a dynamically scalable solution is possible. If channel conditions permit a lower complexity approach, CASPR 155 completes in less time. During these periods, fewer computing resources are required. Power can be saved by anticipating the complexity of the task when a scalable processing system is used to support the adaptation.

In an embodiment utilizing a self-adapting spatial processor, the processor makes predictions for provisioning sufficient compute resource and may equip the algorithm on the resource. In one example of this functionality, CASPR 155 can fully enable and/or disable a modular computing resource in the technical environment. CASPR 155 can also utilize dynamic provisioning among memory-resident algorithms as a mitigation step.

For example, CASPR 155 can utilize data obtained from tracking a trajectory of a Unmanned Aerial Vehicle (UAV) using GPS (or an equivalent) and can predict future location and heading with high confidence over a look-head horizon of tens of seconds to hours, depending on the intent of the piloting system. The UAV may be modeled as a Dubins vehicle where pattern and speed are estimated independently. As a national asset, a large UAV may operate over a scheduled flight path: in this case, path prediction needs to determine the slow and fast components of the pattern and the range of speed variations. When the intent cannot be well established, future flight path certainty is limited by the vehicles kinematic limitations such as turn radius.

In this example, CASPR 155 may apply a kinematic filter to estimate the (auto)pilot's present intent and our confidence in this determination. In the simplest case of a cyclo-stationary pattern, the overall intent is constant and CASPR 155 determines the shape of the path and its parameters (coefficients for a closed curve) with high confidence. When the intent is variable, curvature constraints limit the range of behavior and more complicated Bayesian methods are employed. CASPR 155 can then predict the antenna geometry from the UAV heading and the location of the UAV and ground nodes using simple relationships based on the dot-product expression $\cos \theta_{ad} = a \cdot d / |a||d|$. The definition is used to compute correlation for irregular spaced antenna array. For uniformly spaced arrays, correlation is related to the effective spacing defined in Equation 3 below.

$$(d_r d_t)^{effective} = d_r d_t (\cos \theta \cos \phi \cos \chi - \sin \theta \sin \phi) \quad \text{Equation 3}$$

In Equation 3 above, $\theta$ and $\phi$ are the respective look angles between UAV and ground node antenna, and $\chi$ is the rotation of the UAV frame relative to the ground frame.

Returning to FIG. 3, the adaptation that is applied (S330) can be adapting the receiver by configuring the processor to select a specific MIMO detection method to maximize the average data rate of the RF link system or to minimize the power consumption of the RF link system (S340).

FIG. 3 contains some specific non-limiting examples of detection methods that can be utilized in the present invention. However, in embodiments of the present invention, an adaptation made to the receiver (by PDE) may include configuring the processor to select a specific MIMO detection method to maximize the average data rate of the RF link system, and/or to minimize the power consumption of the RF link system. The method may include demapping each stream of the channel stream independently or utilizing group-wise demapping.

Returning to FIG. 3, in an embodiment of the present invention, the complexity of the specific MIMO detection method is related to at least one of: the spatial correlation metric, or a signal-to-noise ratio of each stream. Based on the spatial correlation metric, the MIMO detection method can include independently demapping each stream of the channel stream (S341). The detection method may also include demapping each stream of the channel stream and co-phasing received signals in the channel stream to maximize the signal-to-noise ratio of each stream (S342). The method may also include utilizing group-wise demapping to jointly detect groups of streams in the channel stream, wherein streams are grouped by applying a correlation metric that groups streams with spatial similarities and polarization similarities (S343).

Returning to FIG. 1, SHARP 165 performs MIMO algorithmic computation and signal interconnection. Benefits of SHARP include, but are not limited to, permitting operation at peak power efficiency (GOPS/W) by proactively switching processor cores between active, low-power standby, and off states to match the MIMO processing requirements for anticipated channel conditions. This technique avoids unnecessary power consumption by portions of computing resources utilized in the system 100 that are not required for signal decorrelation, at a given time. One embodiment of the present invention that utilizes SHARP 165 can cut power dissipation by about a factor of 17 in low-correlation conditions (<0.43) compared with architectures that are not power-managed, and that thus operate with maximum processing capacity enabled at all times.

A further benefit of a MIMO system using SHARP 165 is that SHARP 165 resolves key aggregation and distribution (the 'cross-bar') problems of MIMO processing, by using a transpose interconnection and a time-sliced frame-based parallel processing architecture. This technique is particularly critical at high rates, given that interconnection bandwidths for digital MIMO processing are expanded by the analog to digital conversion process. For example, at information rates of, e.g. 100 Gb/s, these can approach several hundred Gb/s.

In embodiments of the present invention, SHARP 165, the computing architecture of the system 100 reduces receiver power consumption while addressing the interconnect and distribution challenge of MIMO—the 'crossbar' problem—which requires that signals from each aperture be collected for common processing. Through a novel 'transposed' interconnect together with local switching, SHARP 165 is a frame-sliced MIMO processor in which a set of data frames are allocated successively to processor complexes. In an embodiment of the present invention, when the first complex is done, a scheduler provides it a new frame on which to operate. In this way, the number of active processor complexes is minimized. Standby processors are held in one of several low power states, most desirably fully unconfigured and in their lowest power state. The size of the processing complex is determined by the capacity of a given processor and the maximum complexity of the MIMO processing supported.

In an embodiment of the present invention, SHARP 165 includes general purpose processors (GPP) with FPGA-based computational accelerators, to expedite algorithm development through the use of conventional software (computer code), while preserving the capability to migrate functions into FPGA-based accelerators as needed to speed processing. This architecture can be propagated into the future with a complete substitution of custom FPGA modules. The design is modular between apertures, processing, and data rates, which increases applicability.

In an embodiment of the present invention, SHARP 165 ensures that its processors are in the correct state (active, standby, fully disabled) when needed requires prediction of processing requirements. Given that these requirements are affected by system geometry, SHARP 165 (utilizing one or more processors to execute computer code) bases the prediction on PAT information with sufficient lead time to execute its power management approach and may fully disabling SHARP 165 processor complexes. In further embodiments of the present invention, in addition to PAT data, SHARP 165 augments location and heading data with more detailed channel information provided by the receiver 110. As an example, without power scaling, a fixed 'always-on' computing resource delivers 2410 operations per bit even under low correlation when only 143 might be required, and the power advantages of this factor of 17 difference in MIMO algorithm complexity are lost.

Returning to FIG. 3, the processor, executing computer code, may optimize a state of an interconnected multi-element digital processing subsystem based on at least one of the following: the MIMO detection method, or the policy, wherein the policy is one of high rate or high energy efficiency (S350). In an embodiment of the present invention, the processing subsystem executes computations in fixed point arithmetic in field programmable gate arrays (FPGA). Fixed-point processing affords particularly high CDW in the FPGA platform, and SHARP 165 may leverage such advantages by managing the configuration of the data on which the computations are executed. In an embodiment of the present invention, the states of the processing resources include one of: active, standby, or off. In an embodiment of the subsystem operates on collections of time synchronous samples from each receive aperture of the receiver, where each collection processes an element of the multi-element collection. In an embodiment of the present invention, each collection is allocated to each element through a switch or through a fixed interconnection matrix. In an embodiment of the present invention, each collection is allocated to each element through a fixed interconnection matrix and the fixed interconnection matrix is based on optical fiber. In an embodiment of the present invention, the state of each element of the processing subsystem is controlled to reduce the power consumption of the multi-element collection.

As explained earlier, aspects of the method depicted in FIG. 3 can be individually incorporated into a given system. For example, a system may not perform functionality associated with the PDE 130, but may be configured to perform a method of adapting MIMO detection at a receiver in a high rate radio frequency (RF) link system that includes obtaining, by a processor, spatial correlation estimates related to a channel stream based on pointing acquisition and tracking data, and system geometry. The method may also include determining a level of spatial correlation and based on the determining, applying a MIMO detection method comprising demapping each stream of the channel stream independently or utilizing group-wise demapping to demap the streams of the channel stream.

Figure 5:
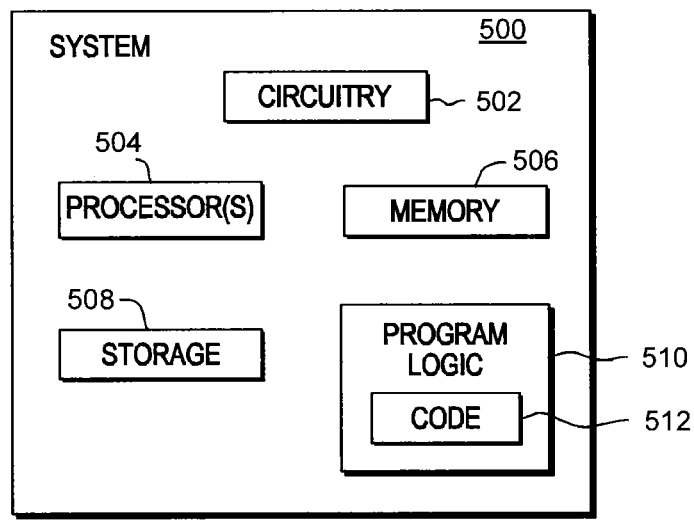
FIG. 5 depicts a computer system configured to perform an aspect of an embodiment of the present invention.

FIG. 5 illustrates a block diagram of a resource 500 in computer system 100, such as receiver processor 115 (FIG. 1), and CASPR 155 (FIG. 1), which is part of the technical architecture of certain embodiments of the technique. Returning to FIG. 5, the resource 500 may include a circuitry 502 that may in certain embodiments include a microprocessor 504. The computer system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Figure 6:
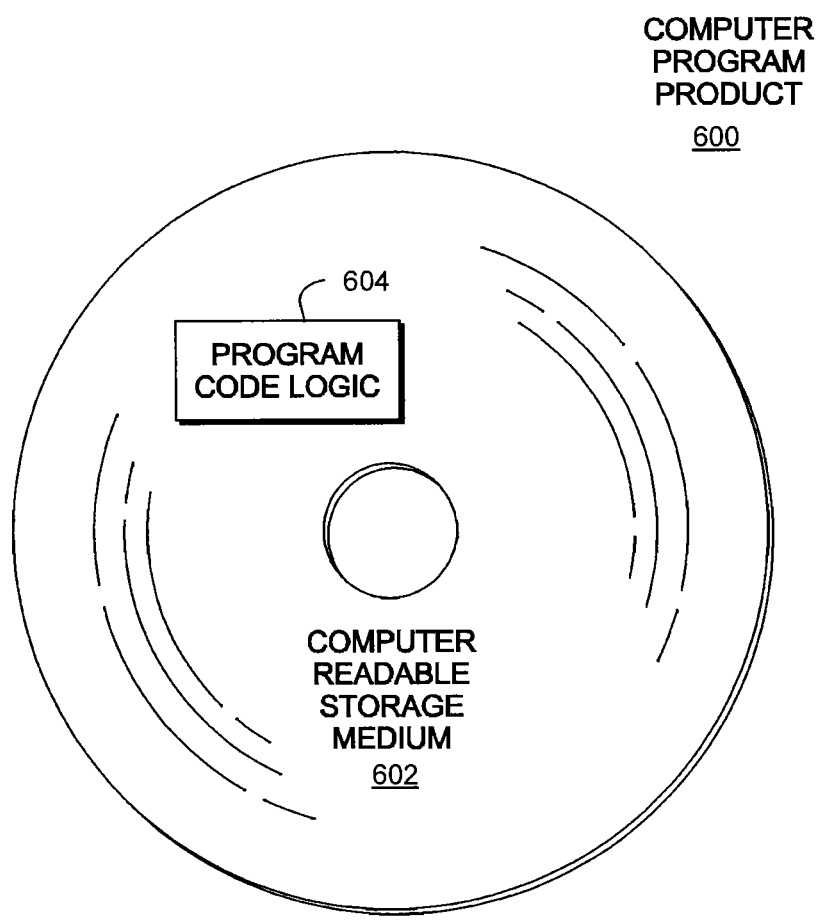
FIG. 6 depicts a computer program product incorporating one or more aspects of the present invention.

Using the processing resources of a resource 500 to execute software, computer-readable code or instructions, does not limit where this code can be stored. Referring to FIG. 6, in one example, a computer program product 600 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software, such as the software 10 in FIG. 1, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The invention claimed is:

1. A method of optimizing a Multiple-Input Multiple-Output signal processing transmitter and a Multiple-Input Multiple-Output signal processing receiver in a high rate radio frequency (RF) link system, comprising:

determining, by a processor, communicatively coupled to a receiver, during spatial processing, at least three metrics based on spatially processing a channel stream obtained by the receiver to obtain antenna pointing and tracking information and channel measurements, wherein the channel stream comprises a plurality of streams, the at least three metrics comprising:
- a spatial correlation metric representing spatial coupling between multiplexed streams in the channel stream, wherein the determining the spatial correlation metric comprises predicting the spatial correlation metric utilizing the antenna pointing and tracking information;
- a signal-to-noise power ratio metric representing propagation losses encountered by the signal, wherein the determining the signal-to-noise power ratio metric comprises predicting the signal-to-noise ratio metric by utilizing the antenna pointing and tracking information; and
- a cross polarization discrimination metric representing whether polarization modes can be treated as independent groups in spatial processing, wherein the determining the cross polarization discrimination metric comprises estimating the cross polarization discrimination metric through the channel measurements,
  - wherein the processor determines at least one of the at least three metrics based on obtaining geometric information related to the receiver and the transmitter;
- applying a policy comprising at least one objective of the RF link system, wherein the objective of the policy is one of high data rate or high energy efficiency for the RF link system; and
- based on at least one of the at least three metrics and based on the policy, applying at least one adaptation to at least one of: the receiver or, the transmitter.

2. The method of claim 1, wherein the plurality of streams comprises a feedback channel and wherein the processor obtains at least one of the at least three metrics without utilizing a feedback channel from the receiver.

3. The method of claim 1, wherein the obtaining of the geometric information comprises:
- obtaining, based on tracking a trajectory of an aerial vehicle, geometry of antennas of the transmitter and geometry of antennas of the receiver, and a relative relationship between the geometry of antennas of the transmitter and the geometry of antennas of the receiver.

4. The method of claim 1, wherein the at least one adaptation is selected from the group consisting of:
- adapting power levels of the transmitter;
- adapting a MIMO detection algorithm utilized by the receiver; and
- changing processing options at the receiver related to polarization.

5. The method of claim 1, wherein the adaptation comprises at least one of: shutting down the transmitter, or disabling at least one stream of the channel stream.

6. The method of claim 1, wherein the adaptation comprises demapping each stream of the channel stream independently or utilizing group-wise demapping.

7. The method of claim 6, wherein the complexity of the specific MIMO detection method is related to at least one of: the spatial correlation metric, or a signal-to-noise ratio of each stream.

8. The method of claim 7, further comprising:
- changing, by the processor, a state of an interconnected multi-element digital processing subsystem based on at least one of the following: the MIMO detection method, or the policy, wherein the state comprises one of: active, standby, or off.

9. The method of claim 8, wherein the interconnected multi-element digital processing subsystem executes computations in fixed point arithmetic in field programmable gate arrays.

10. The method of claim 8, wherein the interconnected multi-element digital processing subsystem operates on collections of time synchronous samples from each receive aperture of the receiver, wherein each collection processes an element of a multi-element collection.

11. The method of claim 10, wherein each collection is allocated to each element through at least one of: a switch, a fixed interconnection matrix, or a fixed interconnection matrix based on optical fiber.

12. The method of claim 8, wherein the state of each element of the processing subsystem is controlled to reduce the power consumption of the multi-element collection.

13. The method of claim 1, wherein the adaptation comprises utilizing the spatial correlation metric to adjust complexity of demapping processing of the channel stream.

14. A method of adapting MIMO detection at a receiver in a high rate radio frequency (RF) link system, comprising:
- obtaining, by a processor, spatial correlation estimates related to a channel stream, wherein the spatial correlation estimates are based on both pointing acquisition and tracking data and system geometry;
- based on the spatial correlation estimates determining, by the processor, a level of spatial correlation; and
- based on the level of spatial correlation, applying a MIMO detection method comprising demapping each stream of the channel stream independently or utilizing group-wise demapping to demap the streams of the channel stream.

15. The method of claim 14, wherein the MIMO detection method further comprises:
- co-phasing received signals in the channel stream to maximize the signal-to-noise ratio of each stream.

16. An RF communication system incorporating multiple-input multiple-output (MIMO) digital signal processing, the system comprising:
- a transmitter comprising a plurality of spatially separated antennas configured to transmit a channel stream comprising a plurality of streams to a receiver, wherein line of sight propagation is the dominant transmission mode;
- the receiver comprising a plurality of spatially separated antennas, configured to receive the channel stream;
- a memory; and
- a processor communicatively coupled to the transmitter and the receiver and in communications with the memory, wherein the system is configured to perform a method, the method comprising:
  - determining, by a processor, communicatively coupled to a receiver, during spatial processing, at least three metrics based on spatially processing a channel stream obtained by the receiver to obtain antenna pointing and tracking information and channel measurements, wherein the channel stream comprises a plurality of streams, the at least three metrics comprising:
    - a spatial correlation metric representing spatial coupling between multiplexed streams in the channel stream, wherein the determining the spatial correlation metric comprises predicting the spatial correlation metric utilizing the antenna pointing and tracking information;

a signal-to-noise power ratio metric representing propagation losses encountered by the signal, wherein the determining the signal-to-noise power ratio metric comprises predicting the signal-to-noise ratio metric by utilizing the antenna pointing and tracking information; and a cross polarization discrimination metric representing whether polarization modes can be treated as independent groups in spatial processing, wherein the determining the cross polarization discrimination metric comprises estimating the cross polarization discrimination metric through the channel measurements, wherein the processor determines at least one of the at least three metrics based on obtaining geometric information related to the receiver and the transmitter;

applying a policy comprising at least one objective of the RF link system, wherein the objective of the policy is one of high data rate or high energy efficiency for the RF link system; and based on at least one of the at least three metrics and based on the policy, applying at least one adaptation to at least one of: the receiver or, the transmitter.

17. The system of claim 16, wherein the adaptation comprises adapting the receiver by configuring the processor to select a specific MIMO detection method comprising one of: demapping each stream of the channel stream independently or utilizing group-wise demapping.

18. The system of claim 17, further comprising:

an interconnected multi-element digital processing subsystem, wherein the method further comprises changing, by the processor, a state of the interconnected multi-element digital processing subsystem based on at least one of the following: the MIMO detection method selected, or the policy, wherein the state comprises one of: active, standby, or off.

* * * * *